United States Patent [19]
Gallington

[11] 3,942,376
[45] Mar. 9, 1976

[54] DIAPHRAGM TYPE ANGLE OF ATTACK INDICATOR

[76] Inventor: Roger W. Gallington, 505 Adelman Circle, S.W., Vienna, Va. 22180

[22] Filed: Aug. 14, 1974

[21] Appl. No.: 497,416

[52] U.S. Cl. .................... 73/180; 73/182; 73/407 R
[51] Int. Cl.² ........................................ G01C 21/00
[58] Field of Search.... 73/180, 182, 407 R, 407 PR, 73/178 T

[56] References Cited
UNITED STATES PATENTS
2,948,149    8/1960    Schuck ................................ 73/180

*Primary Examiner*—Donald O. Woodiel
*Attorney, Agent, or Firm*—Joseph E. Rusz; Arsen Tashjian

[57] ABSTRACT

An angle of attack indicator for use as a cockpit instrument including movable variable-area diaphragms which respond to the differences in pressure at selected points on the aircraft. The pressure points may include the total pressure sensed by the aircraft pitot tube and two other pressures at least one of which varies strongly with the angle of attack. The mechanism divides the difference between total pressure and one of the other two pressures by the difference between the total pressure and the other of the other two pressures obtaining a pressure coefficient which depends only on the shape and angle of attack of the aircraft. The use of the variable diaphragm as the sensitive element of a low level pressure sensor as in an aircraft airspeed indicator is described.

5 Claims, 5 Drawing Figures

DIAPHRAGM TYPE ANGLE OF ATTACK INDICATOR

BACKGROUND OF THE INVENTION

This invention relates to an angle of attack indicator and, more particularly, the invention is concerned with providing a diaphragm type instrument for use on aircraft to give an indication of the angle of attack based on movement of the point of maximum pressure down around the leading edge of the wing, or other aerodynamic shape, as the angle of attack is increased and the pressure decreases as one moves away from the point of maximum pressure.

The "angle of attack" may be defined as the term given to the angle of air flow relative to the chord line of a wing. This value is critical during most phases of flight especially including takeoff, climb, cruise, glide, approach, missed approach and landing. In takeoff the normal procedure is to head the aircraft down the runway at full throttle and accelerate the aircraft to takeoff airspeed and then apply a slight amount of back pressure to the control column. The airspeed must then increase to a point of providing sufficient lift to support the aircraft in flight. Since we are depending on airspeed alone, the lift-off point is rather uncertain and can be unnecessarily delayed by too little or too much back pressure on the control column. Too little back pressure will cause the aircraft to attain higher than normal speed before sufficient lift is obtained. This can produce a time delay and result in the use of additional runway. Too much back pressure to the control column will cause a decrease in the forward velocity of the aircraft because of the increase in drag, resulting in a loss of lift and an aborted takeoff.

Since the wing lift is related to its angle of attack, an indication of this angle to the pilot can improve his takeoff procedure and make his control function positive. The takeoff procedure utilizing the angle of attack information would be to proceed down the runway while accelerating to the takeoff airspeed recommended for the particular aircraft and then apply a steadily increasing back pressure to the control column while referring to the angle of attack indicator. Utilizing this procedure, the aircraft will become airborne when its wing angle of attack is the proper value for sustaining lift. By following the above procedure the aircraft will become airborne in the least distance with a positive reference to the actual wing lift.

During final approach and landing, it is important to maintain the aircraft at the minimum maneuvering airspeed which is normally 30 per cent above stall airspeed. The actual airspeed is a compromise at the discretion of the pilot to compensate for varying conditions of aircraft load, weather and wind velocity and windshear. However, because of the aircraft's inertia as well as the natural lag in response of the airspeed indicator, it is difficult for the pilot to keep the airspeed constant and, consequently, keep the glide angle constant. Thus, it would be desirable to provide an angle of attack indicating system which is instantaneously responsive so that the pilot could maintain the aircraft at the best approach angle of attack and, therefore, a constant glide angle. This would enable the pilot to fly the aircraft closer to the stall angle with confidence especially if it were necessary to land in a relatively short runway distance.

SUMMARY OF THE INVENTION

The present invention is concerned with providing a diaphragm type angle of attack indicator for use in inexpensive aircraft or aircraft operating in severe conditions, such as icing, rough ground handling, combat etc. The operation of the indicator is based on the principle that pressures sensed at appropriately selected points on an aircraft can be used to obtain the pressure coefficient which is formed by dividing the difference of one pair of pressures by the difference of a second pair of pressures. The pressure coefficient thus formed depends only on the angle of attack of the aircraft. A large variety of mechanisms can be designed for utilizing this principle to obtain the aircraft angle of attack.

The operation of the diaphragm type angle of attack indicator can be explained by observing the pressure coefficient which is given by:

$$C_p = \frac{p - p_\infty}{p_o - p_\infty} \qquad (1)$$

where:

$p_o$ is the total pressure sensed by the aircraft pitot tube, $p_\infty$ is the atmospheric pressure sensed by the aircraft static pressure port, and $p$ is the pressure sensed by a static pressure port on the wing surface. The pressure coefficient is a function of the shape of the aircraft, the position of the static pressure port on the wing surface and the angle of attack of the wing. Therefore, if one fixed the geometry of the airplane and the position of the static port on the wing surface, then the pressure coefficient, $C_p$, depends only on the angle of attack.

Accordingly, it is an object of the invention to provide an angle of attack indicator based on the principle that a non-trivial pressure coefficient formed by dividing the difference of two pressures by a different difference of two pressures, a minimum of three pressures being required, depends only on the angle of attack.

Another object of the invention is to provide a balance type angle of attack indicator that is inexpensive to manufacture yet is reliable and rugged making it especially suitable for use in relatively inexpensive aircraft. The pilots of lighter military aircraft can be provided with an angle of attack indicator, for the first time, leading to more accurate and safer approaches with fewer missed approaches.

Still another object of the invention is to provide a diaphragm type angle of attack indicator wherein the pressure coefficient is determined by conveying the changes in pressure from various points on the aircraft to a variable area diaphgragm arrangement which operates a linkage system to indicate the angle of attack of the aircraft.

A further object of the invention is to provide a diaphragm type angle of attack indicator wherein the means for mechanically dividing one pressure difference by another includes a variable area diaphragm.

A still further object of the invention is to provide a variable area diaphragm mechanism for use as a low level pressure sensor suitable for an air speed indicator.

Another still further object of the invention is to provide a variable area diaphragm mechanism for use as an accurate laboratory pressure gage.

These and other objects, features, and advantages will become more apparent after considering the following detailed description taken in conjunction with the annexed drawings and appended claims.

DESCRIPTION OF A PREFERRED EMBODIMENT

Figure 1:
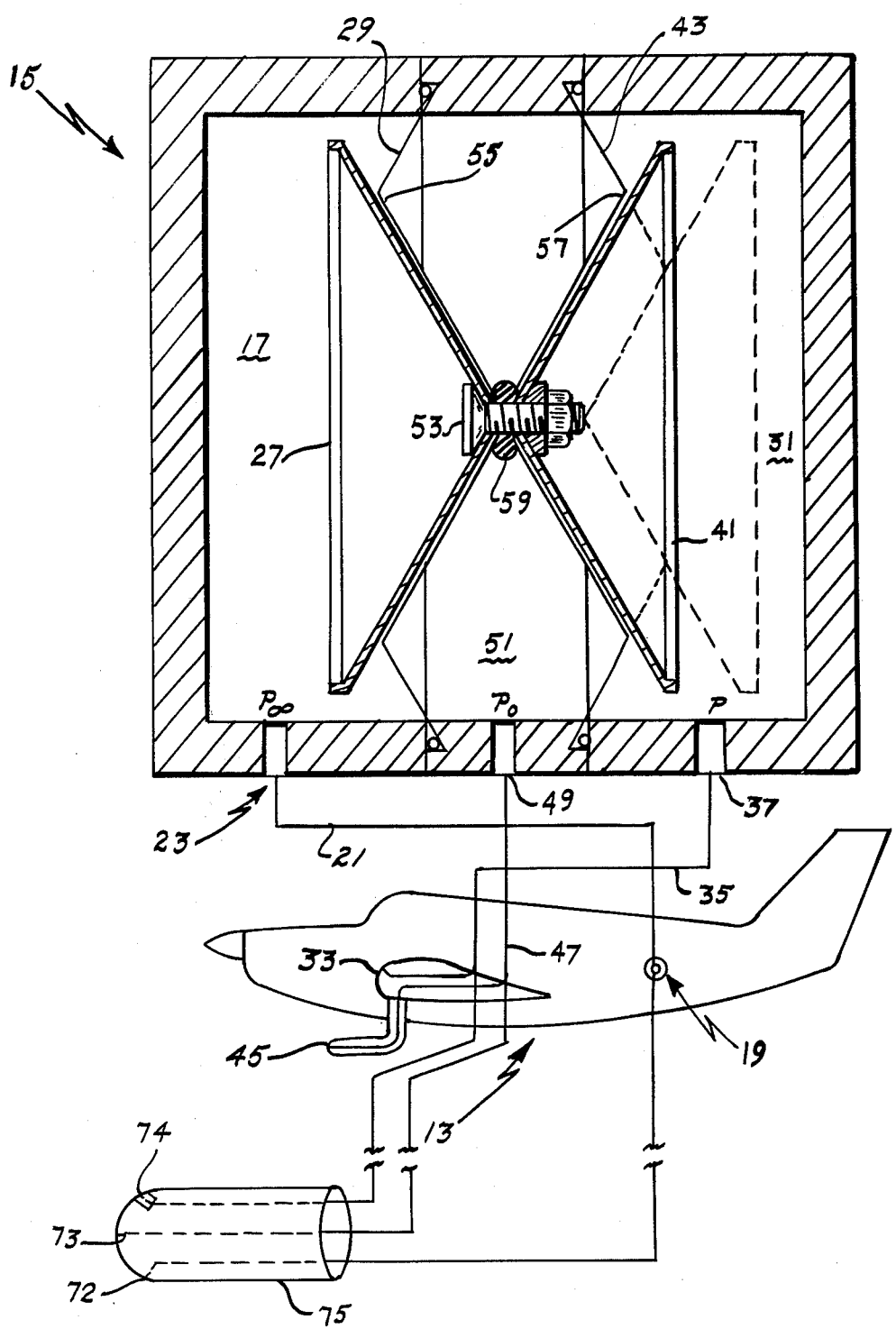
FIG. 1 is a schematic view of a diaphragm type angle of attack indicator according to the invention showing the variable area diaphragm mechanism and the positions on the aircraft from which the pressures are conveyed.

Referring now to the drawings, in FIG. 1 there is shown one of the preferred embodiments of the invention which indicates the angle of attack of the aircraft 13. The indicator itself includes an enclosure 15 which is effectively divided into three sections. The first of the sections 17 is operatively connected to the static pressure port 19 of the aircraft 13 by means of the tube 21 through the opening 23 in the enclosure 15. A variable area diaphragm mechanism consisting of a light aluminum backing plate in the form of a surface of revolution such as a cone 27 and a thin "Mylar" correspondingly configurated diaphragm in the formr of a plastic cone 29 separates the section 17 from the remainder of the enclosure 15. "Mylar" is a trademark of the E. I. Dupont Co. for transparent film of polyethylene terephthalate resin. A second section 31 is operatively connected to the wing static pressure port 33 of the aircraft 13 by means of the tube 35 through the opening 37 in the enclosure 15. Likewise, the section 31 is separated from the other sections of the enclosure 15 by another variable area diaphragm mechanism consisting of another light aluminum cone 41 and another thin "Mylar" plastic cone 43. The remainder 51 of the enclosure 15 is operatively connected to the aircraft pitot tube 45 by means of the tube 47 through opening 49 in the enclosure 15. The two light aluminum cones 27 and 41 are attached to each other near their apexes by the specially shaped bolt 53. The O-ring 59 is compressed to hold the "Mylar" against the aluminum to prevent leaks.

The total pressure sensed at the pitot tube 45 and conveyed to the central section 51 through tube 47 and opening 49 is the highest pressure in the system causing the "Mylar" cones 29 and 43 to be pressed against their respective aluminum cones 27 and 41 near the center; and also causing the "Mylar" cones to retain an inflated conical shape near their outside edges. As the aluminum cones 27 and 41 move together to the left and right the creases 55 and 57 in the "Mylar" cones roll along the aluminum cones turning the "Mylar" cones insideout in the process. The aluminum cones 47 and 41 require no separate supporting structure. The aluminum cones 27 and 41 are supported by the inflated "Mylar" cones 29 and 43 much as the steel wheel of an automobile is supported by the tire.

As the angle of attack of the aircraft 13 is increased, the pressure $p$, sensed at the wing static pressure port 33 becomes lower reflecting the increased lift. The pressure $p_o$ sensed at the aircraft pitot tube 45 and the pressure $p_\infty$ sensed at the aircraft static pressure port 19 remain unchanged assuming constant speed, air density and atmospheric pressure. The lowered pressure $p$ is conveyed from the wing static pressure port 33 through tube 35 to section 31 in the cockpit mounted enclosure 15. The reduced pressure in section 31 causes the two aluminum cones 27 and 41 to move to the right. As the aluminum cones 27 and 41 move to the right the crease 57 in "Mylar" cone 43 rolls into a smaller radius while the crease 55 in "Mylar" cone 29 rolls out to a larger radius. In this displaced position (indicated by the broken lines in FIG. 1) the pressure difference between sections 51 and 31 acts over a smaller area than previously while the pressure difference between sections 51 and 17 acts over a larger area. The effective area of the variable area diaphragm mechanisms 25 and 39 is the area inside the circular creases 55 and 57 respectively. The aluminum cones 27 and 41 seek an equilibrium position where the pressure difference between sections 51 and 31 times the area inside circular crease 57 equals the pressure difference between sections 51 and 17 times the area inside circular crease 55. Thus, each aircraft angle of attack results in a single equilibrium position of the cones 27 and 41. Conversely the position of the cones 27 and 41 is an indication of the angle of attack.

To show that the position of the cones 27 and 41 does not change as the airspeed of the aircraft 13 is changed at constant angle of attack, consider first the particular case where $p = p_\infty$ causing the cones 27 and 41 to be in equilibrium at mid position shown by the solid lines in FIG. 1. As the speed is increased, $p_o$, is increased causing equal increases in pressure on the variable area diaphragm mechanisms 25 and 39. $p_\infty$ is of course unchanged by the acceleration. The pressure coefficient at the wing static pressure port 33 is given by $$C_p = \frac{(p - p_\infty)}{(p_o - p_\infty)}$$

and depends only on the shape of the airplane 13 and its angle of attack. If $p = p_\infty$ before the acceleration, then $C_p = 0$ and since the angle-of-attack and/or shape of the airplane were not changed during the acceleration, $C_p = 0$ after the acceleration also. Therefore $p = p_\infty$ after the acceleration and the pressure difference across the two variable area diaphragm mechanisms increased by an equal amount and since the areas were the same for this case; there is no net force developed to move the aluminum cones.

A similar argument can be constructed for any equilibrium position of the cones, but is is easier to show mathematically that the position of the cones depends only on the pressure coefficient $C_p$ which in turn depends only on the angle of attack for an aircraft of given shape.

We begin by equating the pressure difference between sections 51 and 17 times the area of the left variable diaphragm mechanism to the pressure differences between section 51 and 31 times the area of the right variable area diaphragm mechanism $$A_l (p_o - p_\infty) = A_r (p_o - p)$$

The effective area of the left variable area diaphragm mechanism $A_l$ is equal to $\pi r_l^2$ when $r_l$ is the radius of crease 55. The effective area of the right variable area diaphragm mechanism $A_r$ is equal to $\pi r_r^2$ where $r_r$ is the radius of crease 57.

$$\frac{r_l^2}{r_r^2} = \frac{p_o - p}{p_o - p_\infty} = 1 - C_p$$

Now $r_l$ and $r_r$ are functions of the position of the cones "$x$" by the kinematics of the variable area diaphragm mechanisms.

$$f(x) = 1 - C_p$$

Therefore the position of the cones "$x$" depends only on the pressure coefficient $C_p$ and consequently only on the angle of attack for an aircraft of fixed shape.

To avoid tapping into the existing aircraft pitot-static system the three ports 23, 49, 37 may be operatively connected to the three ports 72, 73, and 74 respectively of a probe 75 which is mounted on the exterior of the aircraft much as the common pitot tube. The operation similar to that described above except that the relevant pressure coefficient is $$C_p = \frac{p_c - p_u}{p_c - pl}$$

where $p_c$ is the pressure sensed at the center port 73, $p_l$ is the pressure sensed at the lower port 72, and $p_u$ is the pressure sensed at the upper port 74. As the angle-of-attack is increased the point of maximum pressure moves downward on the rounded nose of the probe causing a reduction in pressure at the upper port 74 and an increase in pressure at the lower port 72. These pressure changes conveyed to chambers 31 and 17 through tubes 35 and 21 respectively cause the cones to be displaced to the to the right. The equilibrium position of the cones is again insensitive to aircraft speed or altitude and depends only on the angle of attack by the same argument as presented above for the configuration making use of the aircraft total and static pressure ports.

Figure 2:
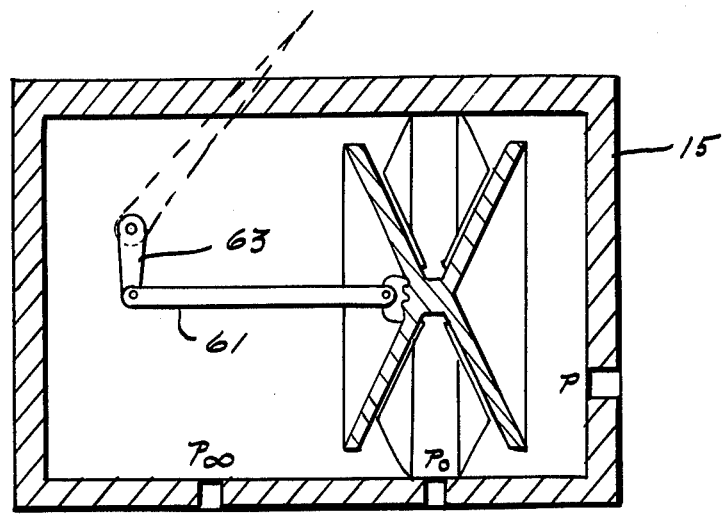
FIG. 2 is a schematic view of a mechanism for displaying the cone position to the pilot by the use of a connecting rod and crank mechanism.
Figure 3:
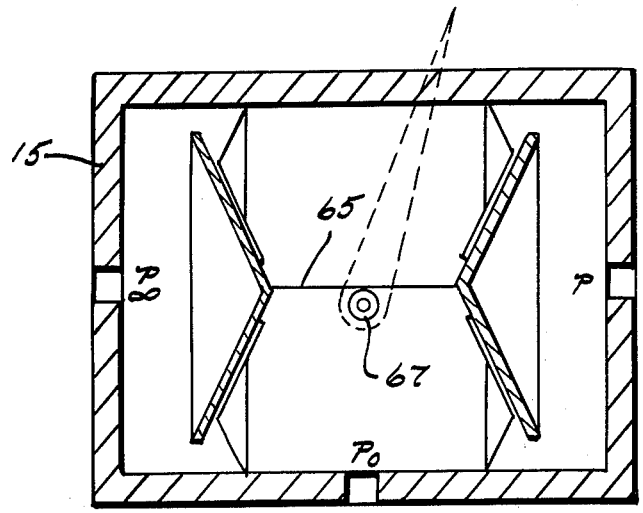
FIG. 3 is a schematic view of another display mechanism wherein the two variable area diaphragms are separated by a string wrapped around a shaft which rotates in response to lateral motion and drives an indicator needle.

In order to make a useful pilot instrument the position of the cones 27 and 41 must be displayed to the pilot. Possible mechanisms for displaying the cone position to the pilot are shown in FIGS. 2 and 3. In FIG. 2 a simple connecting rod 61 and crank 63 mechanism converts the linear motion of the cones to rotary motion of the indicating needle. In FIG. 3, the two variable area diaphragm mechanisms are separated and restrained from outward movement by a string 65 wrapped around a shaft 67 windless fashion. As the cones move back and forth the shaft rotates driving the indicating needle. Clearly, any number of mechanisms can be devised to indicate the position of the aluminum cones and consequently the angle of attack to the pilot.

The aluminum backing plates and "Mylar" diaphragms need not be flat sides but could have convex or concave sides provided the aluminum and "Mylar" cones have the same shape so that the "Mylar" will roll smoothly along the aluminum.

Figure 4:
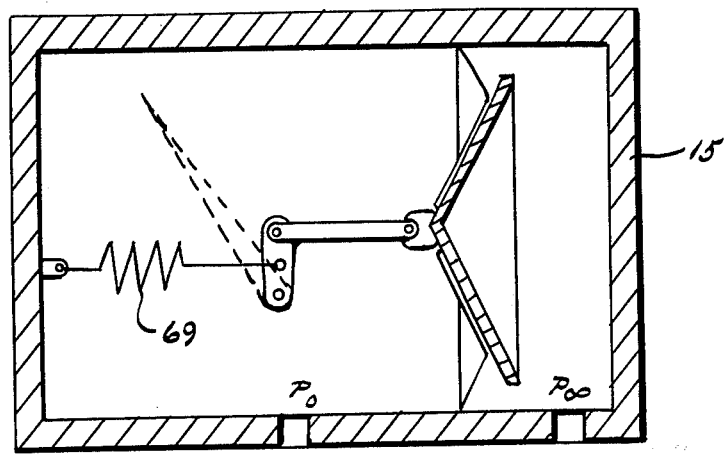
FIG. 4 is a schematic view of a variable area diaphragm mechanism which would be suitable for use as a low pressure level pressure gage to indicate airspeed.

A low pressure level pressure gage suitable as an airspeed indicator can also be constructed using the variable area diaphragm mechanism. Such a device is shown in FIG. 4 where the single variable area diaphragm mechanism is arranged to deflect a calibrated spring 69 with increasing airspeed.

Figure 5:
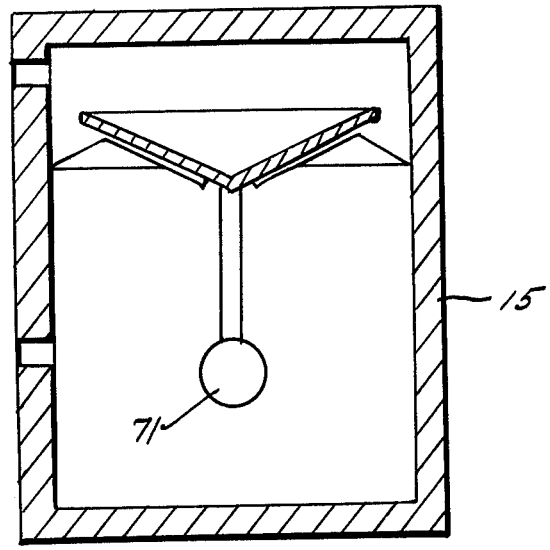
FIG. 5 is a schematic view of a variable area diaphragm mechanism which would be suitable for use as a laboratory pressure gage to accurately measure very small pressure differences.

Another pressure gage more suitable for laboratory work is illustrated in FIG. 5 where the variable area diaphragm mechanism acts against a fixed weight. In this case the enclosure 15 is made transparent or some other optical means is provided for observing the position of the internal mechanism. Because of the complete absence of mechanical friction this instrument is able to accurately measure very small pressure differences.

Angle of attack indicators generally lead to more accurate and safer flight in all phases, especially take off, approach, missed approach and landing. The hereinbefore described apparatus is also useful as an airspeed indicator where accurate measurement of low airspeed is necessary as in helicopter and S.T.O.L. aircraft. The low level pressure sensor is particularly useful in general laboratory work.

Although the invention has been illustrated and described in terms of preferred embodiments thereof, it will be apparent to those skilled in the art that certain changes, alterations, modifications and substitutions, particularly with respect to the construction details, can be made in the arrangement and location of the various pressure sensings elements without departing from the true spirit and scope of the appended claims.

Having thus set forth and disclosed the nature of my invention, what I claim is:

1. A diaphragm type angle of attack indicator for use as an aircraft instrument comprising, means for sensing three pressures on the aircraft, at least one of said three pressures varying strongly with angle of attack, another of said three pressures being greater than the other two pressures, tubing means for transmitting the pressures to a central area, and means at the central area for dividing the difference between the greatest pressure and one of the two lesser pressures by the difference between the greatest pressure and the other of the two lesser pressures, said dividing means including an enclosure having three operatively connected sections, pressure from a different point on the aircraft being transferred to each of the sections in said enclosure, the first of the sections being operatively connected to one of the two lesser pressures, the second of the sections being operatively connected to the other of the two lesser pressures, the third of the sections being operatively connected to the greatest pressure, a pair of rigid, members shaped as surfaces of revolution, one each being positioned in each of the first and second sections and having their apexes fixedly attached to each other, a pair of flexible plastic diaphragms positioned in the third section one each being in contact with the back surface of each of said rigid members, said flexible diaphragms effectively separating the third section from the first and second sections, such that changes in pressure in the first and second sections produces a lateral movement in said pair of rigid members, said movement corresponding to the difference in pressures at pressure points on the aircraft and to the angle of attack thereof.

2. The diaphragm type angle of attack indicator defined in claim 1 wherein said pair of flexible plastic diaphragms are formed of high strength clear plastic film.

3. The diaphragm type angle of attack indicator defined in claim 2 wherein the pressure in the third section causes said clear plastic film to be pressed against said rigid members and roll therewith as the rigid members move laterally in response to pressure changes in the second section to expose varying areas of the rigid members to the pressure differences between the sections thereby maintaining the rigid members in equilibrium.

4. The diaphragm type angle of attack indicator defined in claim 3 wherein a connecting rod is connected to one of said rigid members for lateral movement therewith, a crank mechanism pivotably connected to the outer end of said connecting rod, and an indicator needle attached to said crank mechanism for movement therewith to convert the linear movement of the rigid members to rotary motion of the indicating needle.

5. The diaphragm type angle of attack indicator defined in claim 3 wherein the rigid members are joined at their apexes by a string wrapped around a shaft and an indicating needle attached to said shaft for movement therewith such that lateral movement of said rigid members produces a corresponding rotary motion of said shaft and indicating needle.

* * * * *